United States Patent
Dorrer et al.

(10) Patent No.: US 7,289,697 B2
(45) Date of Patent: Oct. 30, 2007

(54) OPTICAL PULSE SHAPER HAVING HYBRID PLANAR LIGHTWAVE CIRCUIT AND FREE-SPACE OPTICS WITH MEMS PISTON-MOTION MICROMIRRORS AND FEEDBACK CONTROL

(75) Inventors: Christophe J. Dorrer, Matawan, NJ (US); Dan Mark Marom, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/236,291

(22) Filed: Sep. 27, 2005

(65) Prior Publication Data

US 2007/0071385 A1    Mar. 29, 2007

(51) Int. Cl.
*G02B 6/32* (2006.01)
*G02B 6/43* (2006.01)

(52) U.S. Cl. .................................................. 385/18
(58) Field of Classification Search ............. 385/18
See application file for complete search history.

(56) References Cited

U.S. PATENT DOCUMENTS

2004/0136648 A1* 7/2004 Chen et al. ............... 385/24
2004/0234192 A1* 11/2004 Madsen ...................... 385/24
2004/0252938 A1* 12/2004 Ducellier et al. ......... 385/27
2005/0185878 A1* 8/2005 Doerr et al. ................ 385/14

* cited by examiner

*Primary Examiner*—Sung Pak
*Assistant Examiner*—Jerry T. Rahll

(57) ABSTRACT

An optical pulse shaper without polarization dependencies includes, a planar lightwave circuit (PLC) having an arrayed waveguide and free space optics, combined with a lens and micromirror array characterized by piston-motion. The micromirror array is coupled to a controller that provides signals to the array for adjusting the positions of the micromirrors, which are used as a spatial light modulator to provide at least phase modulation to one or more of the separated frequency components of an input optical signal. The frequency separated components, including modified components, are recombined and directed back to the PLC to form a synthesized optical pulse. Information regarding the characteristics of the synthesized optical pulse is extracted from a spectrogram of that pulse. Extracted information is provided to the controller and responsive thereto the controller may generate signals for adjusting the position of one or more micromirrors.

15 Claims, 4 Drawing Sheets

OPTICAL PULSE SHAPER HAVING HYBRID PLANAR LIGHTWAVE CIRCUIT AND FREE-SPACE OPTICS WITH MEMS PISTON-MOTION MICROMIRRORS AND FEEDBACK CONTROL

CROSS-REFERENCE TO RELATED APPLICATIONS

This application is a continuation-in-part of U.S. patent application Ser. No. 10/930,382, filed on Feb. 20, 2004, entitled Method and Apparatus for Free-Space Optical Switching, which is incorporated herein by reference.

TECHNICAL FIELD

The present invention is directed, in general, to an optical device and, more specifically, to a compact spectral-domain pulse shaper with low polarization dependencies.

BACKGROUND

Optical fiber communication system technology has been developed extensively since the first system installation in early 1980s. Most systems are able to operate at a bit rate of 10 Gb/s with 40 Gb/s systems being prototyped and deployed. Additionally, wavelength division multiplexing (WDM) and code-division multiple accessing (CDMA) systems are being used in conjunction with high bit rates, which involves using hundreds of different wavelength channels to support overall data throughput. The ever increasing need for higher bit throughput is being driven by strong demands for transmitting all forms of data and information through global networks including real-time multimedia data, such as movies and videos.

To assist with these extremely high bit rates and multiplexing, it is often necessary to use ultra-fast pulses to achieve modulation of signals with high efficiency. Ultrafast pulse shaping can assist in forming ultra-short bit data streams to be transmitted as short bursts of light, thereby allowing an increase in the data transfer rate. Pulse shaping may also play a role in ultra-fast optical switching, filtering, and amplification.

Shaping ultrafast pulses is nontrivial as it involves working at femtosecond timescales, and dealing with effects associated with the reshaping of an optical pulse as it propagates through optical media. Pulse shaping may be achieved through a spatial Fourier transformation of an incident pulse so as to disperse different frequency components in space, and filtering the chosen frequency components selectively. A recombination of all the frequencies into a collimated beam results in the desired pulse shape.

One conventional method of pulse shaping includes using a grating to spread an input optical pulse so that each different spectral component maps onto a different spatial position. Typical conventional arrangements usually only employ phase modulation, since phase encoding produces appreciable differences in the pulse shape, and phase modulating devices such as liquid crystal modulators (LCM) are readily available. A collimating lens and grating pair are set up in a 4-F configuration (F being the focal length of the collimating lens). An element is placed at the center of the 4F system that will modulate the spectrum. For example, a spatial light modulator (SLM) may be inserted at the Fourier plane to manipulate the spectral amplitude and/or phase components of a light wave.

Microelectromechanical system (MEMS) mirror membranes have also been used for phase modulation as this technology matured, enabling production of smooth and continuous phase variation. The mirror membrane is further advantageous in that the phase modulation is not polarization dependent, although the diffraction gratings of conventional arrangements typically are. Unfortunately, the mirror membrane is more difficult to control due to the actuator coupling and the extended influence regions of each actuator which also precludes the generation of abrupt phase jumps. For both continuous MEMS mirror membrane devices and pixelated devices such as LCM, accurately setting the SLM requires a feedback control mechanism. For pulse compression applications, a nonlinear effect can be used to maximize the pulse peak power as a function of SLM settings. However, for arbitrary waveform synthesis, high-resolution pulse characterization techniques such as spectral interferometry and second harmonic generation frequency-resolved optical gating (SHG-FROG) techniques have been demonstrated for feedback control. While the latter technique does not require a reference pulse, it has direction of time ambiguity, rather low sensitivity, and strong polarization dependence.

A drawback associated with this conventional arrangement is that it tends to be polarization dependent. In laboratory experiments this is not an issue, however, input polarization is usually not known in fiber optic applications and may vary with time making it difficult to control phase and produce stable, accurate pulses.

Another drawback with conventional apparatus used in ultrashort pulse applications is that they tend to be bulky, and do not lend themselves, outside of a laboratory environment, to commercial implementations.

What is needed are compact, polarization-independent apparatus which are operable to produce ultra-short optical waveforms.

SUMMARY

A physically compact, optical pulse shaper without polarization dependencies includes, a planar lightwave circuit (PLC) having an arrayed waveguide (AWG) and free space optics, combined with a lens and a micromirror array characterized by piston-motion. The micromirror array is coupled to a controller that provides signals to the micromirror array for adjusting the positions of the micromirrors, which are used as a spatial light modulator to provide at least phase modulation to one or more of the separated frequency components of an input optical signal. The frequency separated components, including the modified components are recombined and directed back to the PLC to form a synthesized optical pulse.

In a further aspect of the present invention, information regarding the characteristics of the synthesized optical pulse is extracted from a spectrogram of the synthesized pulse. Such extracted information may be provided to the controller, which in turn may generate signals for adjusting the position of one or more of the micromirrors in order to achieve the desired optical output waveform.

BRIEF DESCRIPTION OF THE DRAWINGS

The detailed description is presented with reference to the accompanying figures. In the figures, the left-most digit(s) of a reference number identifies the figure in which the reference number first appears.

DETAILED DESCRIPTION

As noted above, optical pulse shapers have conventionally been constructed using bulk optics and diffraction gratings. Typically, in these conventional schemes, a short optical pulse is provided incident to the diffraction grating, and the resulting diffracted light is focused by a lens to provide a plane where the frequency components of the light are physically separated. Having thus separated the frequency components, various operations, such as phase modulation, can be performed on one or more of the components so as to modify those components, and the one or more modified components may then be combined to produce a desired shaped optical pulse. In other words, the shaped pulse derives its characteristics from the recombined components parts, some or all of which have been modified.

Figure 1:
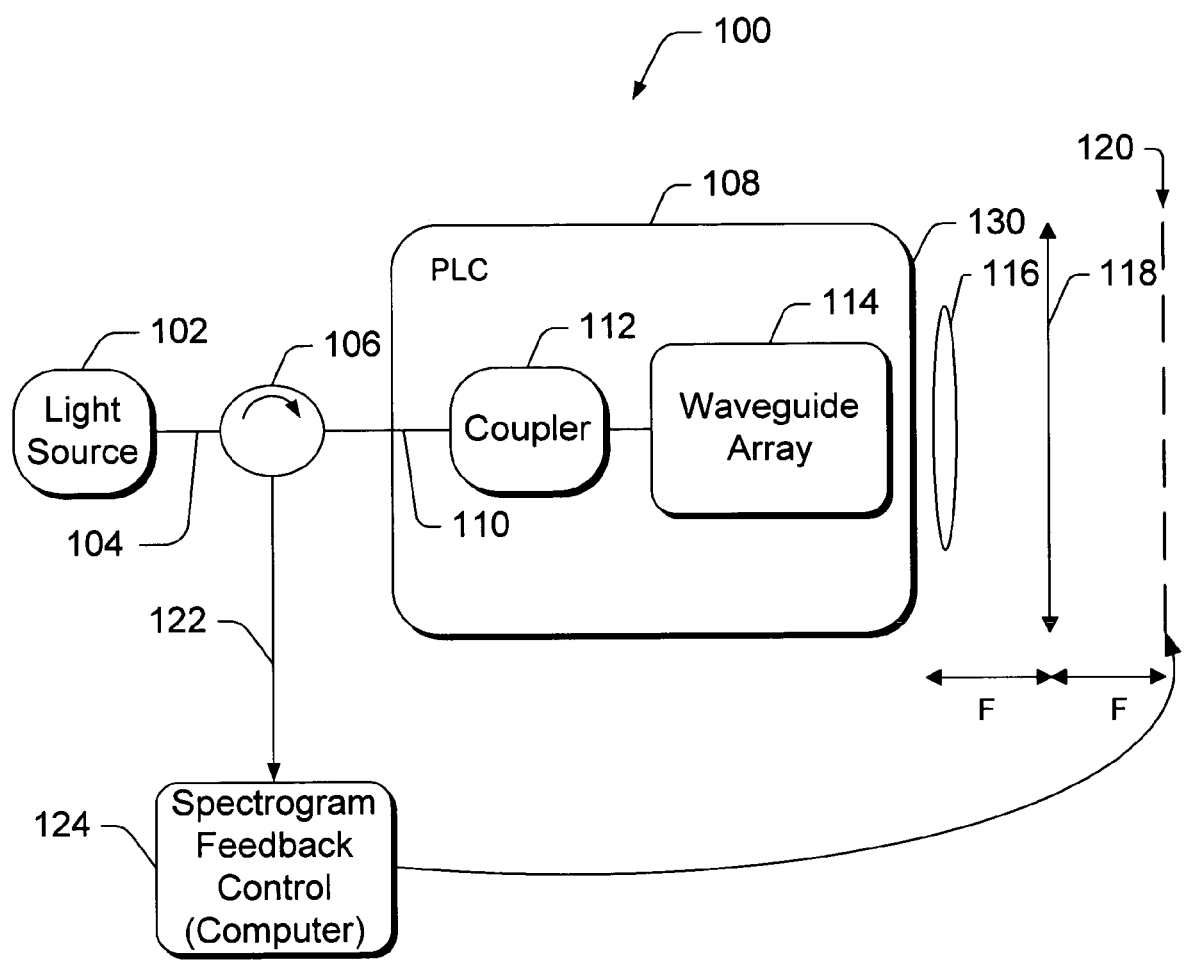
FIG. 1 illustrates various components of an exemplary optical system that can perform pulse shaping utilizing the inventive techniques described herein.

In various embodiments of the present invention, a pulse shaping apparatus combines an arrayed waveguide grating (AWG) in a planar lightwave circuit (PLC) with free-space optics (FIG. 1). This hybrid arrangement results in a physically compact arrangement, and produces a flat Fourier plane, where the spectral components are linearly dispersed, for placement of an SLM. In some embodiments of the present invention the SLM is a MEMS micromirror array where each mirror in the array can be controlled to provide piston-motion. The micromirror sag produces a phase delay, as with the membrane devices. However, the piston-motion micromirror array has no actuator coupling, simplifying the operation and control, but will suffer from diffraction effects, as do pixelated liquid crystal modulators (LCM). A spectrogram characterization technique may be used for reconstructing the complete complex amplitude waveform. Based, at least in part, upon the results of the spectrogram characterization, control signals may be provided to the micromirrors for adjusting the spectral phases so as to achieve a desired ultrashort optical waveform. In other words, a closed-loop system may be constructed so that the micromirrors can be adjusted from an initial setting in order to produce a desired synthesized optical output signal.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Although the use of a PLC and an SLM has been previously demonstrated for pulse shaping applications, placement of an SLM at the edge of the slab lens of an AWG-PLC results in a curved Fourier plane, which is not a good match for most SLM devices. An SLM at the edge of the AWG effectively modulating the waveguide arms, is not applied at the spectrally dispersed plane and hence does not satisfy the Fourier relationship and thus will exhibit excess loss.

Figure 2:
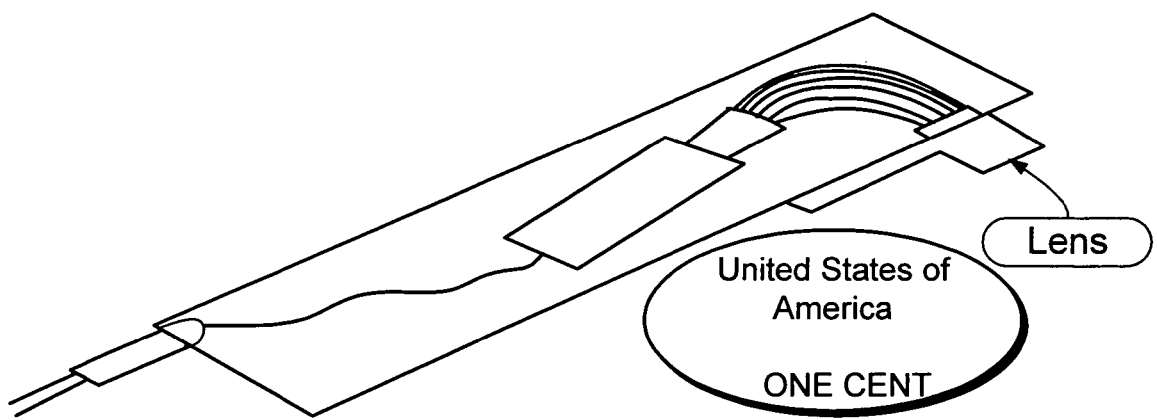
FIG. 2 illustrates an AWG on a PLC terminating at the edge, and a cylindrical lens is affixed for collimation in the confined direction.

In embodiments of the present invention, the AWG terminates at the output PLC facet as shown in FIG. 2. The AWG output signal implements a phased array, due to the propagation length differences in the grating arms. Various embodiments of the present invention may use an external bulk lens to spatially Fourier transform the phased array signal as shown in FIG. 1, yielding a spatially dispersed optical signal at the back focal plane of that lens. In accordance with the present invention, a MEMS piston-motion micromirror array is placed, i.e., disposed, at the back focal plane of the lens performing the spatial Fourier transform, and operates to reflect the spectral components, thereby imparting a phase delay as a function of the micromirror sag. To reduce the vertical mode height at the MEMS micromirror, light radiating out of the PLC may be collimated in the vertical (i.e., confined) direction by a cylindrical lens that may be affixed to the PLC as shown in FIG. 2.

In an illustrative embodiment, the AWG parameters (e.g., 200 waveguides, grating order 38) are optimized for an optical communication application spanning the 1530-1560 nm band. It is noted that higher spectral resolutions can be achieved by increasing the grating order (smaller free spectral range) or increasing the number of waveguides in the AWG. In the illustrative embodiment a 50 mm Fourier lens provided spatial dispersion of 105 μm/nm, and the spot size of a spectral component was 40 μm in the dispersion direction. An approximately 2 ps actively mode-locked laser source, allowed spanning the spectrum across an array of eight piston-motion micromirrors.

Figure 3:
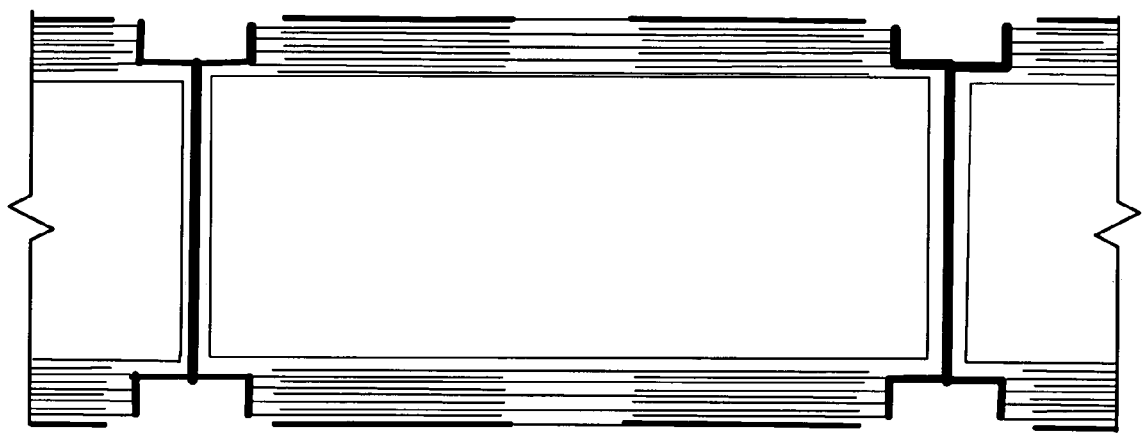
FIG. 3 illustrates a MEMS piston-motion micromirror, fabricated from silicon, within an array of such micromirrors.

In one illustrative embodiment of the present invention, the MEMS micromirrors are fabricated using a surface micromachining process in polysilicon. Each such illustrative micromirror has a width of 54 microns and a thickness of 1 micron, and each is suspended above an electrode plate by spring structures etched in the silicon (0.5 μm feature sizes), forming a 4 μm gap (FIG. 3). The mirror is attracted towards the underlying electrode when a potential difference exists, and acts against the restoring force of the spring. The mirror piston range exceeds $2\pi$ phase modulation (e.g., $2\pi$ at −65V) before snapdown occurs (e.g., approximately −80V), making them well suited for the illustrative SLM application described here.

The electric field of the optical waveform before and after the pulse shaper was completely characterized using the spectrogram technique. In this example, the pulse under test is modulated by an electro-absorption modulator driven synchronously by a 10 GHz RF sine wave. The spectrogram is obtained as a collection of optical spectra measured after the electro-absorption modulator for various relative time delays between the optical pulse and the modulation. Such implementation is polarization-insensitive and has high sensitivity. The temporal intensity and phase of the pulse, as well as its spectral amplitude and phase, are extracted from the measured spectrogram without assumption. From the spectral phases, the phase modulation imparted by the micromirror array can be directly measured.

Figure 4:
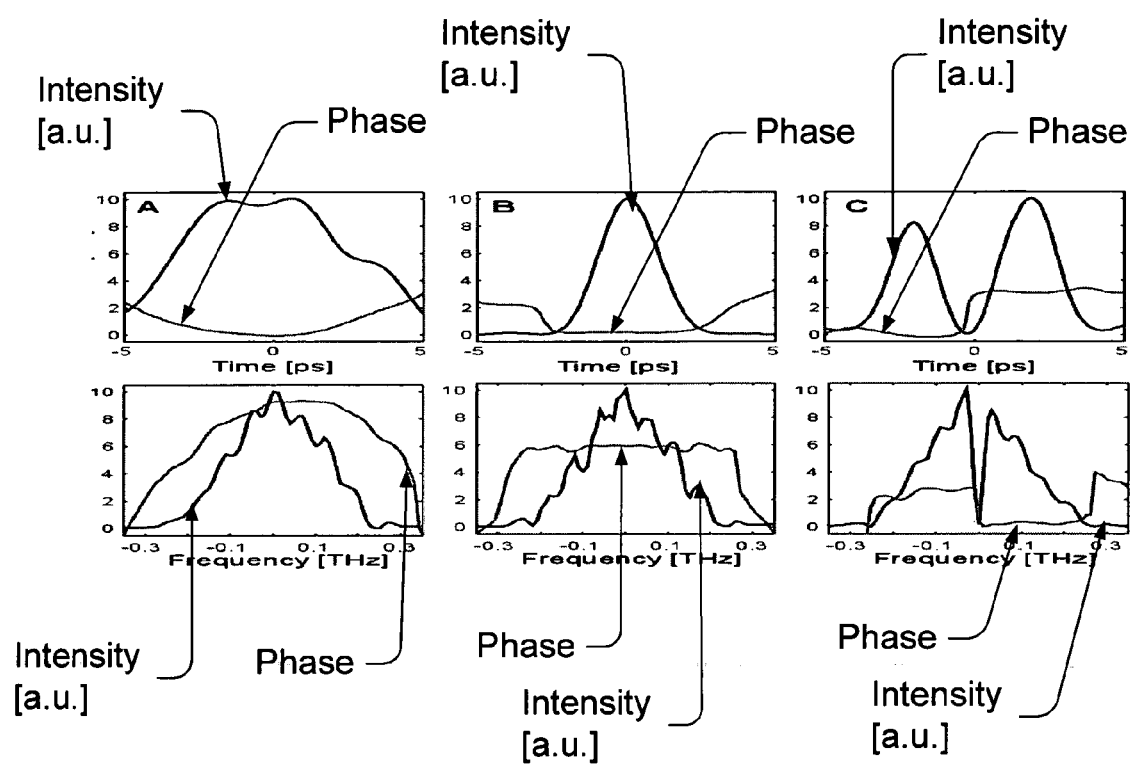
FIG. 4 shows experimental pulse shaping results, wherein Column A shows a dispersed pulse, Column B shows a dispersion compensated pulse, and Column C shows a double pulse by $\pi$ phase jump in spectrum; and wherein the signal is represented in the time domain (first row), and spectral domain (second row).

Various experiments demonstrated the pulse shaping ability in the hybrid free-space apparatus (FIG. 4). In one example, the pulse was stretched to approximately 7.3 ps FWHM using dispersion from 60 m of single mode fiber, resulting in a quadratic phase profile in the time domain and spectral domain (column A). Then the MEMS piston micromirrors were actuated, adjusting the mirror's voltage while observing the spectral phase in an attempt to best flatten it. The resulting pulse was compressed to an approximately 2.3 ps duration (column B), which is close to the Fourier transform limit even though the illustrative eight-mirror MEMS array did not completely contain the spectrum, and the interference effect introduced amplitude modulation around the gap region. Nevertheless, the compressed pulse still exhibits flat temporal phase and high extinction. In a different experiment, an abrupt $\pi$ phase jump at the center of the spectrum was imparted, and a double pulse emerged in the time domain, with a complete null between the two pulses (column C). Polarization effects (e.g., PDL, DGD) were very low except at the gap regions due to finite birefringence of the PLC, which could be corrected in subsequent fabrication.

Referring to FIG. 1, various components of an optical system 100, in accordance with the present invention, which is adapted to perform pulse shaping are shown. Optical system 100 includes a light source 102, an input fiber 104, a circulator 106, a planar lightwave circuit (PLC) 108, input/output fiber 110, a coupler 112, waveguide array 114, a cylindrical lens 116, a lens 118, a reflector device 120, an output fiber 122, and a computer 124.

Light source 102, although typically a short pulse laser, represents any suitable element or combination of elements for producing short light pulses, also referred to herein as input signals, input light, and light beams. An input signal, produced by light source 102, passes through circulator 106 via input fiber 104, and into PLC 108 via input/output fiber 110.

The input signal is then coupled into waveguide array 114 by coupler 112, such as a star coupler or other suitable device. Waveguide array 114 includes a plurality of waveguides (not shown), each having a different path length to an edge facet 130. An input signal sent from light source 102 to waveguide array 114 (light passing through coupler 112) is delayed a different amount in traversing each arm of waveguide array 114. Accordingly, multiple copies of the input signal are projected out of waveguide array 114 and through edge facet 130, but the copies are time shifted (i.e., they have different phases). Hence, waveguide array 114 produces a phased array output which exits edge facet 130 of PLC 108.

Cylindrical lens 116 is positioned adjacent to PLC 108. Cylindrical lens 116 causes light beams of the phased array emitted from waveguide array 114 to be collimated in the confined direction of PLC 108. The collimated phased array is then Fourier transformed by lens 118 onto reflector device 120. Although a particular lens is shown in the exemplary implementation, it is appreciated that any suitable lens that achieves the same functionality may be used.

In one embodiment, reflector device 120 is a microelectromechanical system (MEMS) micromirror array. Each mirror in the array may be moved under control of computer 124 or other suitable control device(s). As will be appreciated, computer 124 achieves its functionality through execution of stored program instructions, or may alternatively achieve its functionality by way of user control. Any suitable control mechanism may be used including, but not limited to, any suitable hardware, firmware, software, or combinations thereof.

With respect to the illustrative embodiment shown in FIG. 1, it will be appreciated that the micromirror array may be configured so as to reflect the light through a different Fourier lens. That is, in an alternative arrangement the phased array of the input optical signal may pass through a first Fourier lens on the way to the micromirror array, and may pass through a second Fourier lens after being reflected by the micromirror array. Similarly, an alternative arrangement of the present invention may be configured such that the optical input signal passes through a first arrayed waveguide on its way to the micromirror array, but may be directed by the micromirror array to pass through a second arrayed waveguide after reflection therefrom. Such a second arrayed waveguide may be part of a stacked planar lightwave circuit in which the first arrayed waveguide is disposed, or the second arrayed waveguide may be physically separate and spaced apart from the first arrayed waveguide.

As noted above, the micromirrors are suspended above an electrode by one or more spring structures, and are attracted towards the electrode by application of a voltage difference between the micromirror and the electrode. In various alternative embodiments, the arrangement of micromirrors, springs, and electrodes may be such that the mirrors may also be tilted with respect to the path of the spectrally resolved light. A MEMS piston-motion micromirror array placed at a back focal plane of Fourier lens 118 reflects the spectral components of the phased array emitted by waveguide array 114.

Reflector device 120 controls the reflection of selected spectral components of the spectrally resolved image back through lenses 118 and 116, and into waveguide array 114, to generate an output signal at input/output fiber 110. The output signal, i.e., the synthesized optical waveform, is fed into test and measurement equipment, which in turn communicates information regarding the synthesized optical waveform to computer 124.

In operation, computer 124, or other suitable control device, determines the positional settings of the various micromirrors of the array of micromirrors that is necessary to produce a desired output waveform from a particular input pulse, and provides to the micromirror array those control signals needed to appropriately position one or more of the micromirrors. After the input pulse has propagated through the waveguide array, collimating lens, Fourier lens, reflected off the mirrors of the micromirror array and passed back through the aforementioned lenses and waveguide array, the resulting optical signal is examined to determine whether it has the desired characteristics. If a determination is made that the resulting optical signal does not match the desired waveform, then the computer, or similar control unit, instructs one or more of the micromirrors to change position. By moving one or more of the micromirrors, a different phase modulation for a particular frequency component will be achieved, and when the components are recombined the resulting optical pulse will manifest the phase change imparted to one or more of its components by the micromirror array.

Computer 124 may perform the operations of determining whether the shaped waveform has the desired characteristics by acquiring information about the resulting, or synthesized, optical waveform. Such information may be acquired by extracting the information about that optical waveform from a spectrogram thereof. It is noted that while a spectrogram is a convenient option, any suitable test and measurement equipment that characterizes the synthesized optical waveform may be used. Based, at least in part, upon the information extracted from the spectrogram, or similar source of information regarding the synthesized optical waveform, computer 124 may generate and communicate, directly or indirectly, the control signals or information needed to adjust the position of one or more of the micromirrors of the micromirror array. Such positional adjustments are designed to modify the synthesized optical waveform by changing the phase modulation of one or more of the frequency components of the optical input pulse.

It is noted that the present invention is not limited to the use of MEMS piston-motion micromirror arrays such as those described above, and that alternative devices, capable of reflecting and directing selected frequency components of the optical input signal can serve as reflector device 120. For example, a transmissive embodiment may be implemented.

The described embodiments are to be considered in all respects only as exemplary and not restrictive. The scope of the invention is, therefore, indicated by the subjoined claims rather by the foregoing description. All changes which come within the meaning and range of equivalency of the claims are to be embraced within their scope.

What is claimed is:

1. A polarization independent optical pulse shaper, comprising:
    a planar lightwave circuit (PLC) including at least one waveguide array;
    a Fourier lens disposed in a free space region adjacent the collimating lens;
    a spatial light modulator having a reflective surface disposed in the free space region at a back focal plane of the Fourier lens;
    a control unit, coupled to the spatial light modulator, operable to modify at least portions of the reflective surface of the spatial light modulator so as to impart a changed phase modulation to at least one frequency component incident thereon such that when recombined with other frequency components received from the PLC, a changed optical pulse will manifest the phase change imparted to the at least one component by the reflective surface;
    a first device coupled to the control unit, the first device operable to provide a characterization information of an optical signal, wherein the control unit is further operable to adjust the control voltages based, at least in part, upon characterization information provided by the first device; and
    a circulator coupled between the PLC and the first device.

2. The optical pulse shaper of claim 1, wherein the spatial light modulator comprises an array of microelectromechanical system (MEMS) mirrors.

3. The optical pulse shaper of claim 1, further comprising a collimating lens disposed adjacent to the PLC.

4. A polarization independent optical pulse shaper, comprising:
    a planar lightwave circuit having an arrayed waveguide disposed thereon, the arrayed wave guide terminating at an edge facet of the planar lightwave circuit;
    a first cylindrical lens disposed adjacent the edge facet where the arrayed wave guide terminates;
    a second lens disposed in a free space region adjacent the first lens;
    an array of micromirrors disposed at the back focal plane of the second lens, and one or more of the micromirrors being positionable responsive to the application of one or more control signals; and
    a controller coupled to the array of micromirrors, the controller operable to reposition at least portions of the micromirror array so as to impart a changed phase modulation to at least one frequency component incident thereon such that when recombined with other frequency components received from the planar lightwave circuit, a correspondingly changed optical pulse will manifest the phase change imparted to the at least one component;
    a circulator coupled to the arrayed waveguide; and
    a first device coupled to the circulator, the first device operable to produce an record a spectrogram; wherein the first device is coupled to the controller.

5. The optical pulse shaper of claim 4, wherein the controller is operable to adjust the control signal based, at least in part, on information extracted from the spectrogram.

6. A method of shaping optical pulses, comprising:
    propagating an input optical pulse to a first arrayed waveguide so as to produce a phased array at an output edge thereof;
    collimating and propagating the phased array through a Fourier lens so as to produce a spatially dispersed optical signal at a back focal plane of the Fourier lens;
    changing a position of at least one micromirror of an array of micromirrors disposed at the back focal plane of the Fourier lens so as to modulate at least a portion of the spatially dispersed optical signal;
    recombining the spatially dispersed and modulated optical signal from the array of micromirrors so that a shaped output optical pulse, different from the input optical pulse, is formed by propagating the spatially dispersed and modulated optical signal through a second Fourier lens, and through a second arrayed waveguide;
    storing an optical signal in a circulator; and
    producing and recording a spectrogram from the optical signal stored in the circulator.

7. The method of claim 6, wherein the array of micromirrors comprises a MEMS structure.

8. The method of claim 6, wherein the arrayed wave guide is disposed upon a planar lightwave circuit.

9. The method of claim 6, wherein changing the position of the at least one micromirror is based, at least in part, upon a predetermined phase modulation of a predetermined spectral component for producing a desired output optical signal.

10. The method of claim 6, further comprising:
    changing the position of one or more micromirrors of the micromirror array, based at least in part upon information extracted from the spectrogram.

11. The method of claim 6, wherein the first and second Fourier lenses are the same lens.

12. The method of claim 6, wherein the first and second arrayed waveguides are the same waveguides.

13. The method of claim 12, wherein determining and changing comprise executing software on a computer.

14. The method of claim 6, wherein collimating comprises passing the phased array at the output edge of the arrayed waveguide through a cylindrical lens disposed adjacent the output edge.

15. The method of claim 6, further comprising:
    determining, based at least in part upon information extracted from the spectrogram, whether the optical signal stored in the circulator conforms to a set of predetermined characteristics; and
    generating, if the determination is negative, one or more control signals adapted to change the position of one or more micromirrors of the micromirror array.

* * * * *